(12) United States Patent
Woolf

(10) Patent No.: US 8,932,724 B2
(45) Date of Patent: Jan. 13, 2015

(54) REFLECTIVE COATING, PIGMENT, COLORED COMPOSITION, AND PROCESS OF PRODUCING A REFLECTIVE PIGMENT

(75) Inventor: Lawrence D. Woolf, Carlsbad, CA (US)

(73) Assignee: General Atomics, San Diego, CA (US)

(*) Notice: Subject to any disclaimer, the term of this patent is extended or adjusted under 35 U.S.C. 154(b) by 744 days.

(21) Appl. No.: 12/795,123

(22) Filed: Jun. 7, 2010

(65) Prior Publication Data

US 2011/0299167 A1 Dec. 8, 2011

(51) Int. Cl.
| | |
|---|---|
| *B32B 5/02* | (2006.01) |
| *B32B 9/00* | (2006.01) |
| *B32B 9/04* | (2006.01) |
| *B32B 15/04* | (2006.01) |
| *C09K 15/00* | (2006.01) |
| *G02B 5/08* | (2006.01) |
| *C09D 5/33* | (2006.01) |

(52) U.S. Cl.
CPC ............. *G02B 5/0891* (2013.01); *C09D 5/004* (2013.01); *G02B 5/0808* (2013.01)
USPC ........... 428/448; 428/403; 428/404; 428/407; 428/450; 428/469; 428/472; 428/689; 252/404

(58) Field of Classification Search
None
See application file for complete search history.

(56) References Cited

U.S. PATENT DOCUMENTS

| | | | |
|---|---|---|---|
| 6,150,022 A | | 11/2000 | Coulter et al. |
| 6,174,360 B1 | | 1/2001 | Sliwinski et al. |
| 6,521,038 B2 | | 2/2003 | Yanagimoto et al. |
| 6,565,770 B1 | * | 5/2003 | Mayer et al. ............. 252/301.36 |
| 6,572,784 B1 | * | 6/2003 | Coombs et al. .......... 252/301.16 |
| 6,699,313 B2 | | 3/2004 | Coulter et al. |
| 7,455,904 B2 | | 11/2008 | O'Keefe |
| 2009/0087553 A1 | | 4/2009 | O'Keefe |

OTHER PUBLICATIONS

Park et al. "Band Gap Engineering of Amorphous Silicon Quantum Dots," 2001, Applied Physics Letters, vol. 78, pp. 2575-2577.*
Martinu et al. "Plasma deposition of optical films and coatings: A review", 2000, J. Vac. Sci. Technol A, vol. 18, Issue 6, pp. 2619-2645.*
Levinson, Ronnen, Ph.D., et al., "Solar Spectral Optical Properties of Pigments, or . . . How to Design a Cool Nonwhite Coating," presented at Cool Roofing . . . Cutting Through the Glare, Atlanta, GA, May 12, 2005, pp. 1-14.

(Continued)

*Primary Examiner* — Michele L Jacobson
*Assistant Examiner* — Seth Dumbris
(74) *Attorney, Agent, or Firm* — Perkins Coie LLP

(57) ABSTRACT

A reflective coating is disclosed that has a base layer provided with a reflective surface for reflecting electromagnetic radiation, such as visible and solar near-infrared light. The reflective coating also has a dielectric layer formed on the reflective surface, and an absorber layer. The absorber layer is formed on the dielectric layer that is formed on the base layer. The reflective coating has an average reflectance greater than about 60% for wavelengths of electromagnetic radiation in the range of 800 to 2500 nm that is irradiated upon the reflective coating. Additionally, the reflective coating has an average reflectance for wavelengths of electromagnetic radiation in the range of 400 to 700 nm irradiated upon the reflecting coating that is less than the average reflectance of the reflective coating from 800 to 2500 nm.

41 Claims, 8 Drawing Sheets

(56) References Cited

OTHER PUBLICATIONS

Levinson, Ronnen, et al., "Solar Spectral Optical Properties of Pigments—Part I: Model for Deriving Scattering and Absorption Coefficients from Transmittance and Reflectance Measurements," Solar Energy Materials and Solar Cells, vol. 89, Issue 4, Dec. 12, 2005, pp. 319-349.

Levinson, Ronnen, et al., "Solar Spectral Optical Properties of Pigments—Part II: Survey of Common Colorants," Solar Energy Materials and Solar Cells, vol. 89, Issue 4, Dec. 15, 2005, pp. 351-389.

* cited by examiner

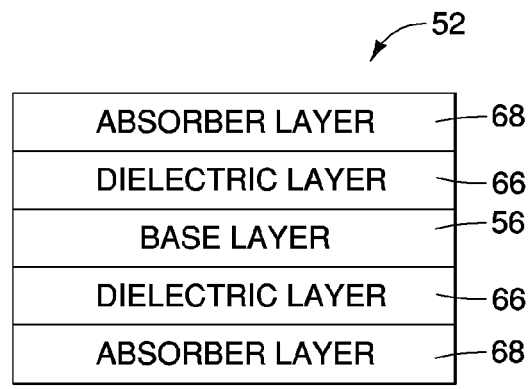
FIG. 5b
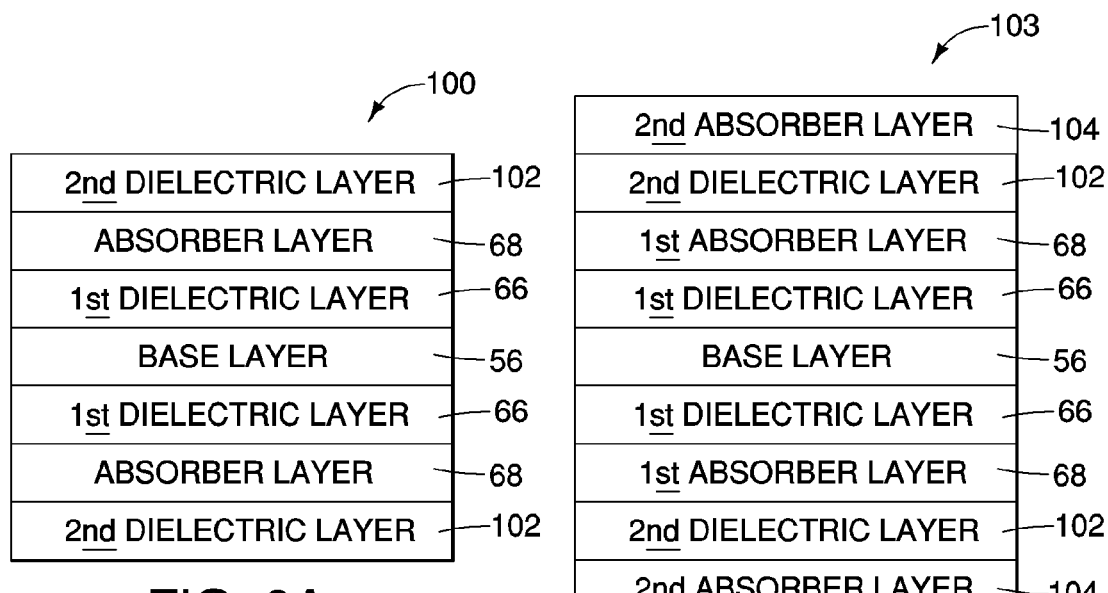
FIG. 8A
FIG. 8B

REFLECTIVE COATING, PIGMENT, COLORED COMPOSITION, AND PROCESS OF PRODUCING A REFLECTIVE PIGMENT

FIELD OF THE INVENTION

The present invention relates to reflective coatings, pigments, colored compositions, and processes of manufacturing reflective pigments for cool color products.

BACKGROUND OF THE INVENTION

Conventional reflective designs such as coatings, pigments and paints having varying optical properties of reflectance, transmittance, and absorptance in different wavelength regions are known. Such designs are utilized in a variety of industries, and can be implemented on objects to improve their optical properties. In particular, such designs provide different reflectance and absorptance values for electromagnetic radiation (e.g., solar radiation) depending upon the wavelength of the electromagnetic energy. Solar energy is mostly composed of visible light having a wavelength in the 400 to 700 nm range (hereinafter visible light region) and solar near-infrared light having a wavelength in the 800 to 2500 nm range (hereinafter solar near-infrared region).

In some designs, reflective pigments added to paint products can be utilized on the surface of objects such as buildings or other structures to reduce how much solar energy is absorbed by the surface, converted to heat, and then transmitted into the buildings. This is because the optical properties of the reflective pigments are formulated to increase reflectance values of visible light and/or solar-near-infrared light in comparison to stand alone non-reflective pigment added paint products.

Cool pigments are available commercially as ceramic or organic pigments and are typically used for cool paints that reflect, transmit, and absorb visible and solar near-infrared light with values that differ from conventional pigments. These cool paints absorb less solar near-infrared light and reflect more solar near-infrared light than paints made with conventional colored pigments while providing a range of visual colors. However, because they also transmit solar near-infrared light, cool paints are often painted on opaque white or other highly reflective backgrounds that increase the reflectance of the solar near-infrared light; the white or highly reflective backgrounds reflect the light that is transmitted through the cool paint. However, it is not desirable for many applications to paint dark cool paints on bright, highly reflective backgrounds, because if the cool paint is scratched or disturbed, then the bright background color appears. For example, if a car, painted with a dark cool paint on a white background, was scratched so that the cool paint was removed and the background color was exposed, then the scratch would appear white. This is undesirable since the dark car would then have a white scratch line. Therefore, it would be desirable to develop cool pigments that were opaque, dark colored, had high solar near-infrared reflectance, and did not require white or highly reflective backgrounds, so that they could be used in paints on dark color backgrounds, such as dark primer coatings.

Metallic flake pigments are also well known in the art and are commercially available. However, there are no known designs for cool pigments that use metallic flake pigments that contain specifically designed multilayer coatings. Generally metallic flakes are designed for visual colors only, or for visual colors that change with viewing angle to yield color shifting paints that are used for anti-counterfeiting applications or for decorative paints. Since multilayer thin film coatings can be specifically designed by appropriate selection of coating materials and thicknesses to achieve properties that do not exist in ceramic or organic pigments, it would be advantageous if multilayer thin film coatings could be designed with optical properties appropriate for cool coatings and cool pigments that were superior to existing cool pigments. It would be further advantageous if these multilayer thin film designs did not require bright or white reflective backgrounds for optimized reflectance.

In temperate climates that have buildings receiving considerable amounts of solar energy, it is desirable to reduce the amount of absorbed solar energy that results in additional heating of buildings. This reduction in thermal heating of buildings enables lower energy costs during cooling of such buildings, which is desired. Similar effects are desirable in other objects, such as cars, etc. which are exposed to solar heating and require cooling.

In many of the above described designs, however, there is a problem in that color selection, especially for dark colors, is not available without greatly reducing the solar near-infrared reflectance. Generally, conventional cool color coatings or paints have an average reflectance value in the solar near-infrared region of less than 50%. Ideally, since solar near-infrared energy is responsible for about half of the solar energy that causes thermal heating in structures such as buildings, cars, and roofs, it is desirable to limit how much of this light is absorbed by the structure. In particular, it would be desirable to have an average reflectance that is much greater than 50% in the solar near-infrared light region.

The reflectance of visible light from an object determines the color of that object. Accordingly, it is also desirable to have an average reflectance of a coating, pigment composition, etc. which coats an object in the visible light range such that dark and bright colors can be readily formed without loss of average reflectance in the solar near-infrared region.

SUMMARY OF THE INVENTION

The problems of the conventional art are overcome with the present reflective coating that increases an average reflectance of electromagnetic energy in the solar near-infrared region and has an average reflectance in the visible light region that ranges from bright to dark.

The invention disclosed herein describes new thin film designs for coatings and pigments that have superior properties for cool coatings and paints compared to existing multilayer thin film coatings known in the art. In particular, designs are disclosed for opaque multilayer thin film coatings that have high solar-near-infrared reflectance for a wide range of colors, including dark colors which have low visual reflectance.

A reflective coating is disclosed that overcomes the problems of conventional coating designs having an average reflectance less than about 50% in the solar near-infrared wavelength region and an average reflectance in the visible wavelength region that is greater than the reflectance in the solar near-infrared region. The reflective coating advantageously can be optimized for different cool colors depending upon a desired color. The reflective coating can also be designed to have a wide range of designed colors with average visible reflectance values ranging from less than 10% to greater than 60%, with solar near-infrared reflectance values that range from greater than about 60% to about 90%. The reflective coating is preferably opaque, so it does not require a white or highly reflective background layer for improved solar near-infrared reflectance.

In one embodiment of the invention, the reflective coating has a base layer provided with a reflective surface for reflecting electromagnetic radiation, and in particular visible and solar near-infrared light. The reflective coating has a dielectric layer formed on the reflective surface, and an absorber layer formed on the dielectric layer. For improved spectral characteristics, the reflective coating is designed to have an average reflectance greater than about 60% for wavelengths of electromagnetic radiation in the range of 800 to 2500 nm (solar near-infrared region) that is irradiated upon the reflective coating. Additionally, the reflective coating design can have an average reflectance for wavelengths of electromagnetic radiation in the range of 400 to 700 nm (visible wavelength region) irradiated upon the reflecting coating that is less than the average reflectance of the reflective coating in the solar near-infrared region. In another embodiment, the average reflectance is greater than about 75% for wavelengths of electromagnetic radiation in the range of 800 to 2500 nm.

In other embodiments, it is envisioned that additional dielectric and absorber layers could be stacked upon the initial dielectric and absorber layers with varying thicknesses to vary the characteristics of the reflective coating, such as average reflectance values and colors of the coating.

Another embodiment of the invention is a reflective pigment having a base layer provided with a top reflective surface and a bottom reflective surface. A dielectric layer is formed on the top and bottom surfaces of the base layer, and an absorber layer is formed on the corresponding layers of the dielectric layer formed on the base layer. The dielectric layer has an index of refraction at 550 nm in the range of about 1.3 to 2.5. Moreover, similar to the reflective coating, an average reflectance of the reflective pigment for wavelengths of electromagnetic radiation in the solar near-infrared range of 800 to 2500 nm irradiated upon the reflective pigment is greater than about 60% and an average reflectance of the reflective pigment for wavelengths of electromagnetic radiation in the visible light range of 400 to 700 nm irradiated upon the reflecting coating is less than said average reflectance of the reflective coating in the solar near-infrared range. It will be appreciated by those versed in the art that paints made using these reflective pigments will have solar near-infrared reflectance values lower than that of the reflective pigments, and that these paint reflectance values can be optimized by using well known techniques such as adjusting the pigment volume concentrations, the percentage of other constituents, and by inducing leafing of the pigments. Furthermore, in other embodiments, the reflective pigment can have additional stacked dielectric and absorber layers depending upon desired average reflectance values in the various wavelength regions and desired color. For most embodiments, the visual reflectance of reflective coatings from 400 to 700 nm can range from near 0% to about 80%, but the solar near-infrared reflectance from about 800 to 2500 nm is above 50%, and preferably above 70%. The near-infrared solar radiation is greatest in the range from about 800 nm to about 1500 nm, and is reduced in the range from 1500 nm to 2500 nm. It is desirable for the reduction of solar near-infrared heating that the reflectance of the coating or pigment to be highest in the range from 800 to 1500 nm, because the near-infrared solar radiation is greatest in that range, so if the coating reflectance is somewhat reduced in the range from 1500 to 2500 nm, the effect is not substantial on the amount of near-infrared solar reflectance.

Unlike the reflective coating which provides a single reflective surface, the present reflective pigment provides two opposing surfaces that act as reflective surfaces. Accordingly, the reflective pigment can be added to paints and the like to improve their reflective characteristics.

In yet another embodiment of the invention a colored composition is provided and includes a polymer medium and a plurality of reflective pigments. The reflective pigments are dispersed in the polymer medium, and are formed in a manner similar to the reflective pigment discussed above. The polymer medium can be, for example, a paint or ink that has improved spectral characteristics due to the addition of the pigments.

A process of producing a reflecting pigment is also disclosed and has steps of providing a releasable substrate with a first absorber layer thereon. Next, a first dielectric layer, a metallic base layer, a second dielectric layer, and a second absorber layer are stacked in this order on the first absorber layer. In additional embodiments, a polymer layer can be stacked on the second absorber layer, and/or it can be used as the initial stacking layer on the releasable substrate, or it can be in the above structure where the metallic base layer is replaced by a metallic base layer/polymer layer/metallic base layer structure. The process also includes a step of removing the releasable substrate from the first absorber layer or polymer layered structure to produce a reflecting pigment.

These and other advantages of the invention will become apparent to persons of reasonable skill in the art from the following detailed description, as considered in conjunction with the accompanying drawings.

BRIEF DESCRIPTION OF THE DRAWINGS

FIG. 5B is a cross-section of the first embodiment of the reflective pigment of FIG. 5a;

FIG. 8A is a cross-section of a fourth embodiment of a reflective pigment;

FIG. 8B is a cross-section of a fifth embodiment of a reflective pigment;

DETAILED DESCRIPTION OF THE PREFERRED EMBODIMENTS

The following is a detailed description of certain embodiments of the invention presently contemplated by the inventor to be the best mode of carrying out his invention.

Generally, embodiments of the present invention are directed to a reflective coating, reflecting pigment, color composition, and process for forming a reflective pigment that have improved spectral characteristics over conventional coatings and pigments used in cool color paints and other cool color products. Embodiments of the present invention use alternating layers of dielectric and specific absorber layers formed on a base layer that are fine tuned to provide an array of cool colors depending upon the thicknesses and number of layers provided on the base layer. The absorber layers have specific properties in that the light absorption of the absorber material decreases as the wavelength increases from 400 to 700 nm, which is the visible wavelength range, and the absorber layers are substantially non-absorbing in the solar near-infrared region of 800 to 2500 nm.

These characteristics of the above dielectric and absorber layers facilitate manufacture of coatings, etc. having specific spectral properties that are advantageous over conventional coatings. For example, embodiments of the invention have an average reflectance for electromagnetic radiation in the range of 800 to 2500 nm irradiated onto the coating that is greater than 60%. Moreover, these embodiments also have spectral characteristics for electromagnetic radiation in the 400 to 700 nm region irradiated upon the coating that can be less than the average reflectance in the 800 to 2500 nm range. In another embodiment, the average reflectance is greater than about 75% for wavelengths of electromagnetic radiation in the range of 800 to 2500 nm.

Figure 1:
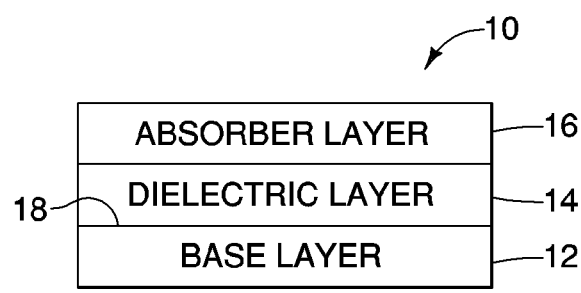
FIG. 1 is a cross-section of a first embodiment of a reflective coating.

Turning now to FIG. 1, an embodiment of a reflective coating, shown generally as 10, includes a base layer 12. Materials of the base layer 12 are selected so as to have the reflective characteristics suitable for the intended use of the reflective coating 10. The presently preferred base layer 12 is a metal layer, and in particular an opaque aluminum (Al) layer. Aluminum is a generally inexpensive material that has good reflectance characteristics in both the visible and near-infrared wavelength range. Additionally, aluminum can be readily formed into thin layers by conventional processes such as sputtering or evaporation. It will be appreciated in view of the teachings herein, however, that other metal layers can be used in place of aluminum.

By way of example, the base layer 12 can be formed from aluminum, copper, silver, gold, platinum, palladium, nickel, copper, cobalt, niobium, chromium, titanium, tin, and combinations or alloys of these or other reflective metals. Other reflective materials include, but are not limited to lanthanide and transition metals including combinations thereof. The thickness of the base layer 12 can be in the range from about 100 nm to about 200 nm, although this range should not be construed as restrictive. Different reflector materials may require other thicknesses of the base layer to obtain desired spectral characteristics, namely a reflective coating that has near maximum reflectance for that material from 400 to 2500 nm and is visually opaque. For example, in one embodiment discussed herein an aluminum base layer has a preferred thickness of 200 nm. However, an aluminum layer having a thickness of about 30 to 250 nm or even thicker can be used, as long as the aluminum is opaque and has high reflectivity of greater than about 90% at wavelengths from 400 to 2500 nm.

As further shown in FIG. 1, the base layer 12 has a dielectric layer 14 formed thereon. Different processes can be used to form the dielectric layer 14 on the base layer. These processes include physical vapor deposition, such as sputtering, thermal evaporation, or electron beam evaporation, chemical vapor deposition, or other thin film deposition processes well known to those versed in the art. The preferable methods are the physical deposition methods of reactive sputtering or reactive evaporation, with the preferred method being reactive magnetron sputtering from dual sputtering targets using mid-frequency ac sputtering. Generally, the dielectric layer 14 preferably has an index of refraction at 550 nm of about 1.3 to 2.5 and an extinction coefficient for electromagnetic radiation in the wavelength range of 400 to 2500 nm of less than about 0.1. More preferably, the index of refraction at 550 nm is between 1.4 and 2.2 and the extinction coefficient from 400 to 2500 nm is less than about 0.01, most preferably essentially zero.

The dielectric layer 14 can be inorganic, since these materials have good rigidity and brittleness properties for conversion of the coating into a pigment. In one preferred embodiment, the dielectric layer 14 is a silicon nitride (SN) layer. However, other dielectric materials that can form the dielectric layer include, but are not limited to, metal fluorides, metal oxides, metal sulfides, metal selenides, metal nitrides, metal carbides, and combinations thereof. Generally, it is envisioned that transparent and substantially non-absorbing materials in the 400 to 2500 nm wavelength range may be used as a dielectric layer.

The thickness of the dielectric layer 14 generally varies in the range from about 10 nm to about 220 nm, although this range should not be construed as restrictive. Different dielectric materials may require other thicknesses of the dielectric layer 14 to obtain specific reflective properties of the reflective coating. In one embodiment discussed herein, a silicon nitride layer has a preferred thickness of 104 nm.

An absorber layer 16 is formed on the dielectric layer. Similar processes as described with respect to the dielectric layer 14 can be used to form the absorber layer 16, although sputtering is currently preferred. The absorber layer 16 may be formed of a semiconductor material. In particular, the structure of the semiconductor can be amorphous. The preferred embodiment of this design uses the absorber layer to absorb light in the visible region from 400 to 700 nm, which allows designs with a wide range of colors to be obtained, including dark colors. As is well known to those versed in the art of thin film design, highly reflective coatings in given wavelength regions are best obtained when the thin film layers are not absorbing in that wavelength region. Since cool coatings are most efficient if they have high reflectance in the non-visible part of the solar spectrum, which is the near-infrared solar wavelengths from about 800 to 2500 nm, it is therefore desirable that the absorber layer that is absorbing from 400 to 700 nm not be substantially absorbing from 800 to 2500 nm. Semiconductor materials are preferred materials for this application, since they are absorbing at wavelengths less than the band gap wavelength and are non-absorbing at wavelengths greater than the band gap wavelength. Therefore, a preferred material for use as an absorber layer would be one with a band gap wavelength corresponding to about 700 to 800 nm. This band gap wavelength corresponds to a band gap energy of 1.55 to 1.77 eV. This band gap energy range encompasses that of amorphous silicon.

An amorphous silicon (Si) layer having a band gap of about 1.7 eV may form the absorber layer 16. For such an amorphous silicon layer, it is preferred to sputter deposit the layer in a vacuum web coater. However, other materials having a similar band gap are envisioned as capable of being used as an absorber layer. Generally, the absorber layer 16 described herein has specific properties that differ from conventional absorber layers. First, the present absorber layer 16 is substantially non-absorbing in the solar near-infrared region. Conventional absorber layers, which are often metals, generally remain absorbing in this entire wavelength region. The preferred extinction coefficient of the absorber layer 16 is less than about 0.3 at 800 nm and is less than about 0.1 at wavelengths greater than about 1000 nm.

Importantly, the silicon absorber layer is preferably sputtered from silicon sputtering targets using methods well known to those versed in the art. The silicon sputtering targets that are commonly used have typical compositions ranging from 100 weight % silicon—0 weight % aluminum to about 90 weight % silicon—10 weight % aluminum, with a preferred composition of 98 weight % silicon—2 weight % aluminum to 94 weight % silicon—6 weight % aluminum. Therefore, the preferred amorphous silicon material used as an absorber layer in these preferred embodiments contains about 2 to 6 weight % aluminum. The preferred silicon nitride dielectric layer is also preferably reactively sputtered using these preferred silicon sputtering targets.

Additionally, the refractive index n and extinction coefficient k of absorber layer 16 varies with wavelength in the visible light region. For example, for absorber layer 16, n can be about 4.5 and k can be about 2.0 at 400 nm and n can be about 4.3 and k can be about 0.4 at 700 nm, and n can be about 4.0 and k can be about 0.1 at 1000 nm. Conventional absorber layers generally do not have this type of characteristic in the visible light region in combination with the near non-absorbing property in the solar near-infrared region.

The thickness of the absorber layer 16 generally varies in the range from about 10 nm to about 100 nm, although this range should not be construed as restrictive. Different absorber materials may require other thicknesses of the absorber layer to obtain specific spectral properties of the reflective coating. In one embodiment discussed herein, an absorber layer is formed as a silicon layer having a thickness of about 56 nm on an aluminum base layer 12 having a reflective surface 18.

Figure 2:
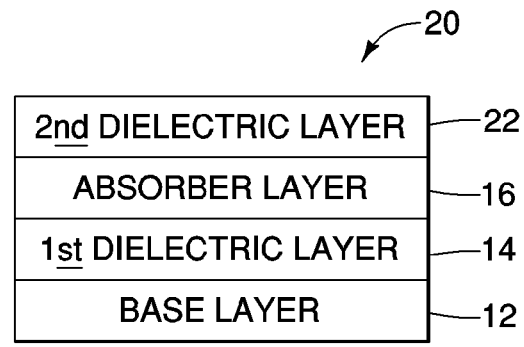
FIG. 2 is a cross-section of a second embodiment of a reflective coating.

FIG. 2 illustrates a second embodiment of a reflective coating 20. In this and the following embodiments of the reflective coatings, like layers of the previous embodiments of the reflective layer are similarly designated for simplicity. Moreover, it is envisioned that different characteristics of the various embodiments of the reflective coatings discussed herein can be interchanged with other embodiments as is known to those skilled in the art.

As shown in FIG. 2, the base layer 12 has the first dielectric layer 14 and absorber layer 16 formed thereon. Additionally, a second dielectric layer 22 is formed on the absorber layer 16. This structure enables a cool color reflective coating to be formed, which has different color and reflectance from that described in FIG. 1.

The second dielectric layer 22 is similar to the first dielectric layer 14, however the thicknesses of the layers can vary, with the thickness of the second dielectric layer 22 generally being different than the first dielectric layer 14. For a first dielectric layer 14 having a thickness in the range of 10 to 220 nm, the absorber layer 16 having a thickness of about 10 to 100 nm, it is envisioned that the second dielectric layer 22 can have a thickness of about 25 to 250 nm. Additionally, the second dielectric layer 22 can have an index of refraction at 550 nm of about 1.3 to 2.5 and an extinction coefficient for electromagnetic radiation in the wavelength range of 400 to 2500 nm of less than about 0.1.

Figure 3:
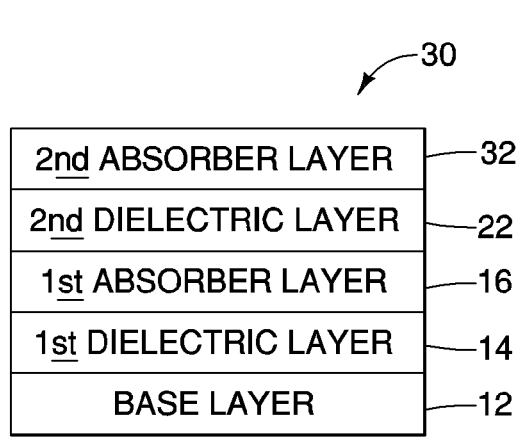
FIG. 3 is a cross-section of a third embodiment of a reflective coating.

Turning now to FIG. 3, a third embodiment of a reflective coating is generally designated as 30. In this embodiment, a second absorber layer 32 is formed on the second dielectric layer 22. For a first dielectric layer 14 having a thickness in the range of 10 to 220 nm, a first absorber layer 16 having a thickness of about 10 to 100 nm, a second dielectric layer 22 can having a thickness of about 90 to 200 nm, it is envisioned that the second absorber layer 32 can have a thickness in the range of about 1 to 200 nm.

Figure 4:
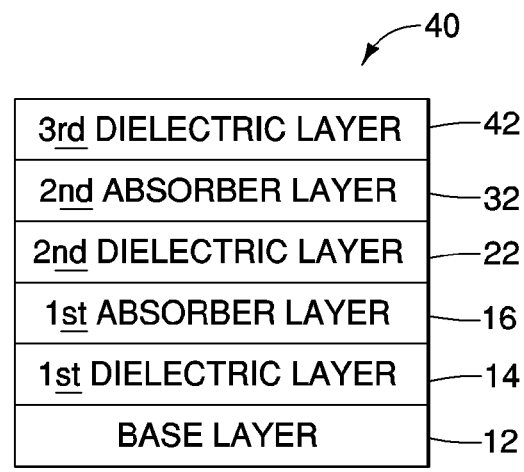
FIG. 4 is a cross-section of a fourth embodiment of a reflective coating.

FIG. 4 illustrates a fourth embodiment of a reflective coating, which is generally designated as 40. Unlike the other reflective coatings, this reflective coating has a third dielectric layer 42 formed on the second absorber layer 32. The third dielectric layer 42, similar to the other dielectric layers, can have an index of refraction at 550 nm of about 1.3 to 2.5 and an extinction coefficient from 400 to 2500 nm of less than about 0.1. Moreover, the third dielectric layer 42 like the other dielectric layers 14, 22 can be formed of silicon nitride.

This structure of the reflective coating 40 enables different colors and reflectance values to be formed compared to the other embodiments 10, 20, and 30 of the reflective coating. The thicknesses of the dielectric layers can vary like the other embodiments. In one preferred embodiment, the first dielectric layer 14 formed on the reflective surface 18 of the base layer 12 can have a thickness of about 30 to 150 nm, and the absorber layer 16 formed on the first dielectric layer can have a thickness of about 40 to 80 nm. Furthermore, the second dielectric layer 22 can have a thickness of about 90 to 200 nm, the second absorber layer 32 can have a thickness of about 2 to 10 nm, and the third dielectric layer can have a thickness of about 30 to 500 nm. In general, embodiments with additional layers provide additional design flexibility to achieve a wider range of colors and high near-infrared reflectance values.

Similar to the other embodiments, the base layer 12 can be a metal layer, such as an aluminum layer. The absorber layers 16, 32 can be a semiconductor, such as amorphous silicon. Moreover, the absorber layers can have an n/k value greater than about 10 at 700 nm and greater than about 100 at 1250 nm, where n corresponds to the refractive index of the absorber layers and k is the extinction coefficient of the absorber layers. In other embodiments, the absorber layers can be formed of amorphous silicon with the dielectric layers formed of one or more of silicon nitride, silicon dioxide, nitrides, oxides, fluorides or other comparable low refractive index materials that are substantially transparent from 400 to 2500 nm.

Figure 5A:
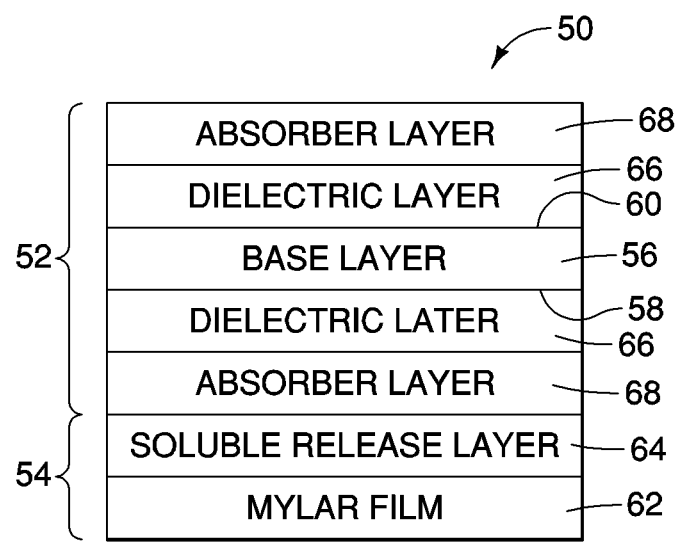
FIG. 5A is a cross-section of a first embodiment of a reflective pigment formed on a release coated Mylar substrate.

A first embodiment 50 of a reflective pigment 52 formed on a releasable substrate 54 is shown generally in FIG. 5A. As is known to those skilled in the art of pigment design, the reflective pigment 52 can be utilized in various mixtures to add color to a base composition such as a polymer to form a color composition. Such compositions can include mixtures such as paints or inks, which provide improved spectral properties to the surfaces coated by the paints or inks. Since the reflective pigment 52 is dispersed within the paint or ink, there are improved reflectance properties of the paint/ink. For example, reflective pigments used with the present invention advantageously provide a paint/ink having improved spectral properties such that for wavelengths of electromagnetic radiation in the solar near-infrared range, an average reflectance of such electromagnetic radiation is greater than about 50%. Moreover, in the visible light range of 400 to 700 nm, the reflectance is less than the average reflectance in the solar near-infrared range of 800 to 2500 nm.

Unlike the reflective coatings 10, 20, 30, and 40 that generally have one reflective side surface that is coated, the reflective pigment 52 has a central layer formed as a base layer 56. Preferably, the base layer 56 is formed of a metal layer, such as opaque aluminum with bottom and top reflective surfaces 58, 60 respectively that facilitate reflection of electromagnetic radiation.

The reflective pigment 52 is formed on the releasable substrate 54, which can be a thin film. In FIG. 5A, the releasable substrate 54 is a Mylar film 62 having a soluble release layer 64 coated thereon. Stacked layers are then formed on the release layer 64 so that a dielectric layer 66 is formed on the top and bottom surfaces 58, 60 of the base layer 56. As used herein with respect to the embodiments of a reflective pigment, a layer refers to coatings symmetrically arranged above and below the base layer.

An absorber layer 68 is formed on the dielectric layer 66, which is formed on the base layer 56. As shown in FIG. 5A, it is necessary to deposit the absorber layer and dielectric layer twice to provide the arranged stacked structure of the reflective pigment 52 having a dielectric layer 66 and absorber layer 68.

Upon completion of the stacked structure, the reflective pigment 52 is removed from the releasable substrate 54. FIG. 5B shows a stand-alone reflective pigment 52. Similar to the reflective coating dielectric layers, the dielectric layer 66 of the reflective pigment 52 can have an index of refraction at 550 nm of about 1.3 to 2.5. The thicknesses of the dielectric layer 66 can be about 10 to 220 nm, and the thickness of the absorber layer 68 can be about 10 to 100 nm. Additionally, the reflective pigment 52 has an average reflectance for wavelengths of electromagnetic radiation in the solar near-infrared region irradiated upon the reflective pigment that is greater than about 60%, and an average reflectance for visible light irradiated upon the reflecting coating which is less than the average reflectance in the solar near-infrared region. The reflective pigment 52 can be added to different mixtures to improve spectral properties of the mixtures. It will be apparent to those versed in the art that the properties of an individual pigment 52 will be the same as those for the coating 50 if the pigment dimensions are about a factor of 10 greater than the largest wavelength to be reflected. Since the reflectance of these designs are high up to 2500 nm or 2.5 microns, the pigment reflectance should be nearly the same as the coating reflectance for pigment sizes greater than about 25 microns. Here size means the typical width and length of the pigment, not the thickness of the pigment. The properties of the paint that is made from these pigments will differ from the pigment properties, depending on the pigment volume concentration and other paint formulation constituents. In one embodiment, the reflective pigment 52 is dispersed in a polymer medium that is substantially transparent from 400 to 2500 nm, for example with transmittance of greater than 90%, to provide a colored composition. This colored composition can be used as an ink or paint, for example, and has improved reflectance properties relative to conventional paint compositions. The polymer medium into which the reflective pigment is dispersed preferably has a long-wave infrared absorption from 5000 nm to about 40,000 nm that exceeds 60%. High long-wave infra-red absorption results in high long-wave infra-red emittance, which also results in the colored composition remaining cooler. Moreover, since the thicknesses of the various dielectric and absorber layers can be selected, different colors can be made. Furthermore, for structures such as buildings using the colored compositions, lower heating of the buildings can be realized due to the improved reflectance of electromagnetic energy in the solar near-infrared wavelength range and high long-wave infrared emittance.

Figure 6:
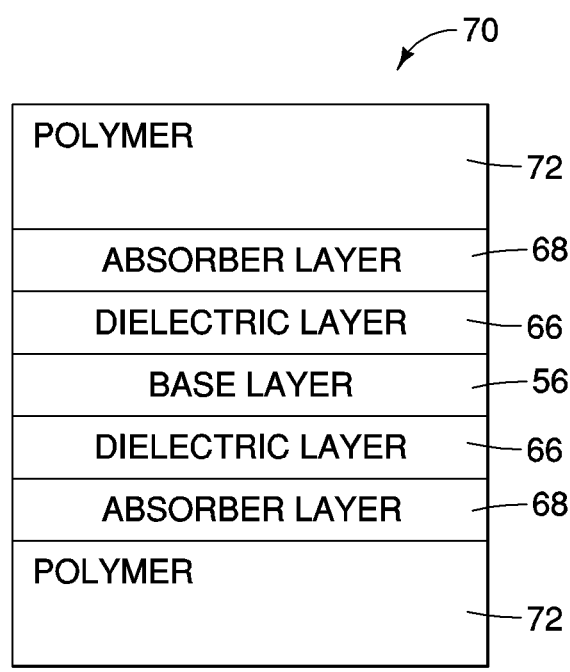
FIG. 6 is a cross-section of a second embodiment of a reflective pigment.

FIG. 6 shows another embodiment of a reflective pigment 70. Although not shown, the reflective pigment 70 is formed on a releasable substrate similar to that shown in FIG. 5A. The reflective pigment is similar to the reflective pigment 52 shown in FIG. 5B, and has similar layers identified with the same reference numbers. However, an outer polymer layer 72 is formed on the absorber layer 68. The polymer layer 72 can have a thickness of about 1000 to 3000 nm. Preferably, the polymer layer is formed of an acrylic, but can be formed of any suitable polymer that is substantially transparent for electromagnetic radiation with wavelengths from 400 to 2500 nm. The polymer layer can be used to reduce the density of the reflective pigment and also increase the volume of the pigment in a cost-effective manner, since polymer layers are low in cost and can be coated rapidly. Since paints are formulated with preferred pigment volume concentrations, by increasing the pigment volume with a low cost polymer layer, the cost of the paint can be substantially reduced without any significant degradation in paint optical properties.

Figure 7:
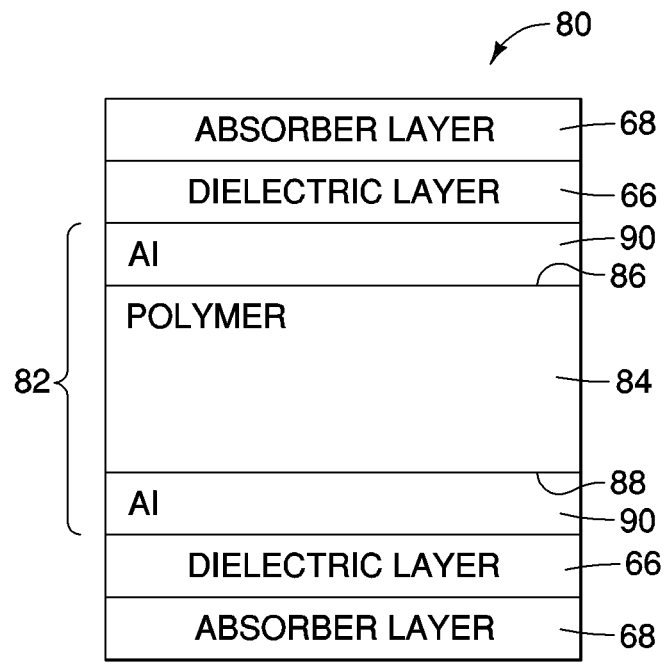
FIG. 7 is a cross-section of a third embodiment of a reflective pigment.

In addition to using a polymer layer as an outside layer in any embodiments disclosed herein, it is possible to have an inner polymer layer that would also be a low cost method for increasing the pigment volume for selected embodiments. FIG. 7 shows an embodiment of a reflective coating 80 which has a base layer 82 formed as an aluminum/polymer/aluminum layered structure with a polymer layer 84 having top and bottom surfaces 86, 88. For this polymer layer 84, the optical properties of the polymer are not critical since this polymer layer is surrounded by opaque aluminum layer 90. The polymer layer 84 is similar to the polymer layer 72, but has the top and bottom surfaces 86, 88 respectively that are coated with the aluminum layer 90. The dielectric layer 66 is formed on the aluminum layer 90, and the absorber layer 68 is formed on the dielectric layer. The polymer layer can be designed to form a substantial portion of the base layer 82.

FIG. 8A illustrates another embodiment of a reflective pigment 100 that has a layered stack similar to the reflective pigment 52 of FIG. 5B. Additionally, a second dielectric layer 102 is provided. The additional dielectric layer 102 facilitates further color and solar near-infrared reflectance values. In this embodiment, thicknesses of the layers can be from about 25 to 500 nm for the second dielectric layer 102, 10 to 100 nm for the absorber layer 68, and 10 to 220 nm for the first dielectric layer 66. The dielectric layers can be formed to have an index of refraction at 550 nm of about 1.3 to 2.5. The absorber layer 68 preferably is formed of a semiconductor material such as amorphous Si, and generally has the properties of absorber layers previously disclosed. The dielectric layers are preferably formed of silicon nitride, and generally have the properties of the dielectric layers previously disclosed.

FIG. 8B illustrates another embodiment of a reflective pigment 103. Additionally, a second absorber layer 104 is provided. The additional absorber layer 104 facilitates further color and solar near-infrared reflectance values. In this embodiment, thicknesses of the layers can be from about 1 to 200 nm for the second absorber layer 104, 90 to 200 nm for the second dielectric layer 102, 10 to 100 nm for the first absorber layer 68, and 10-220 nm for the first dielectric layer 66. The dielectric layers 66, 102 can be formed to have an index of refraction at 550 nm of about 1.3 to 2.5. The absorber layers 68 and 104 preferably are formed of a semiconductor material such as amorphous Si, and generally have the properties of absorber layers previously disclosed.

Figure 9:
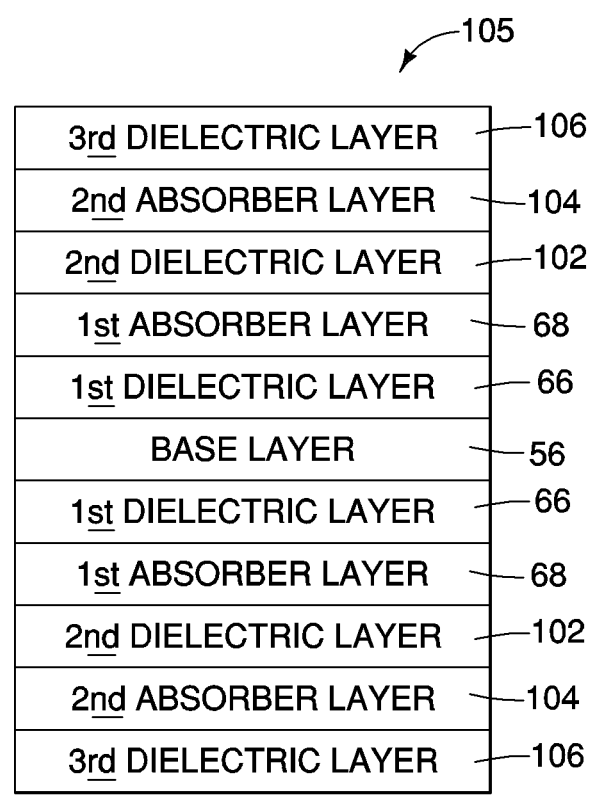
FIG. 9 is a cross-section of a sixth embodiment of a reflective pigment.

FIG. 9 shows another embodiment of a reflective pigment 105 that has an additional dielectric layer 106 formed on the second absorber layer 104 of the embodiment of FIG. 8A. The additional dielectric layer 106 can be a silicon nitride layer, and like the other dielectric layers preferably has an index of refraction at 550 nm of about 1.3 to 2.5. In this embodiment, the first dielectric layer 66 preferably has a thickness of about 30 to 150 nm and the first absorber layer 68 has a thickness of about 40 to 80 nm. The second dielectric layer 102 has a thickness of about 90 to 200 nm, the second absorber layer 104 has a thickness of about 2 to 10 nm, and the third dielectric layer 106 has a thickness of about 30 to 500 nm. Similar to the other embodiments of the reflective pigments, particular select combinations of the thicknesses of the layers provides a wide gamut of cool color combinations with improved spectral characteristics.

Figure 10:
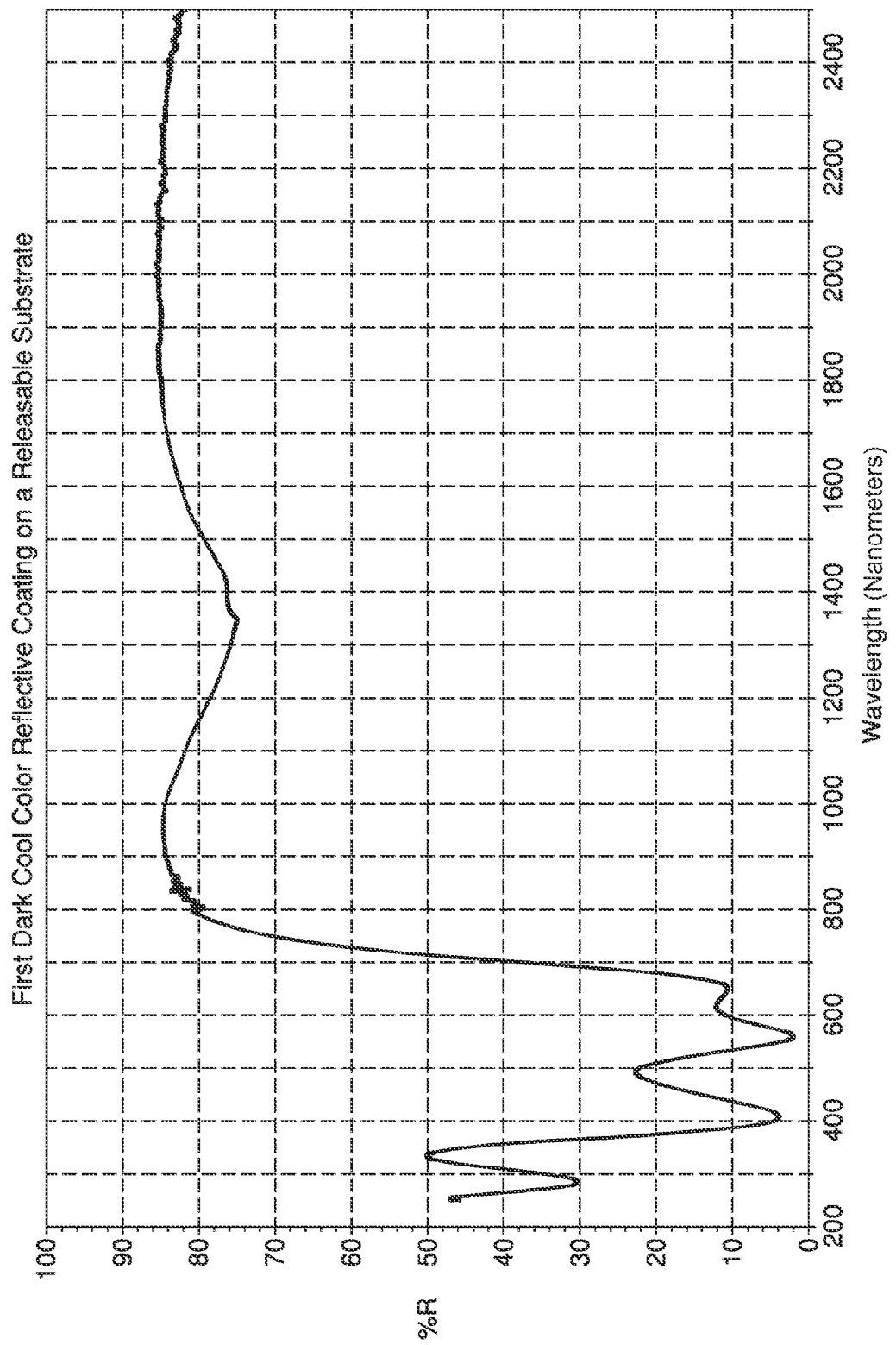
FIG. 10 is an exemplary reflectance versus wavelength plot showing characteristics of a cool color reflective coating.
Figure 11:
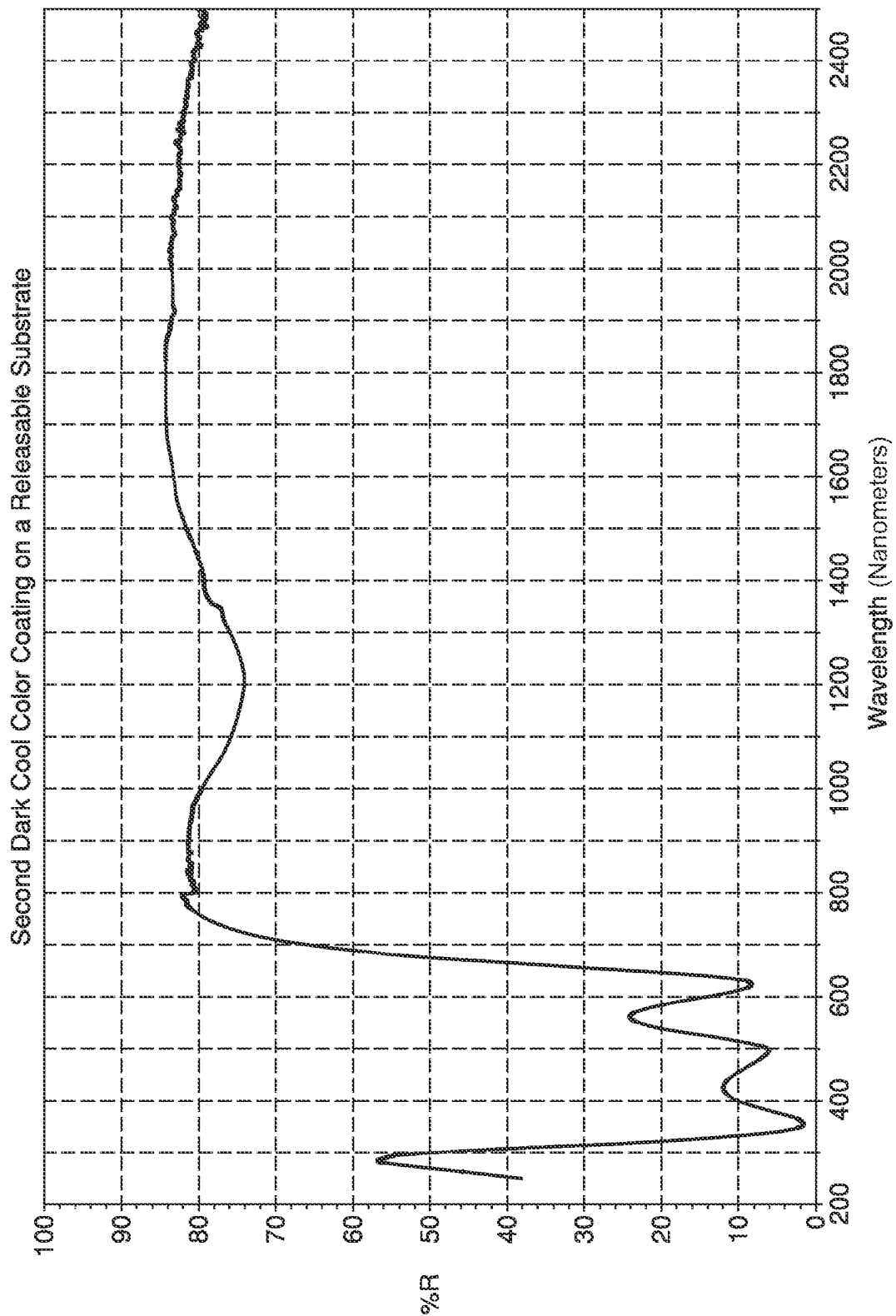
FIG. 11 is another reflectance versus wavelength plot showing exemplary characteristics of another cool color reflective coating.

These improved spectral characteristics of the reflective coatings are exemplified in FIGS. 10 and 11 which illustrate percentage of reflectance versus wavelength characteristics of two cool color reflective coatings attached to a releasable substrate. FIG. 10 shows the total reflectance vs. wavelength for a release coated Mylar film with an opaque evaporated aluminum layer having a thickness of about 200 nm, a first silicon nitride layer having a thickness of 104 nm, a first silicon layer having a thickness of 56 nm, a second silicon nitride layer having a thickness of 150 nm, a second silicon layer having a thickness of 3.7 nm, and a third silicon nitride layer having a thickness of 55 nm.

Similarly, FIG. 11 shows the total reflectance vs. wavelength for a reflective coating on a release coated Mylar film with an opaque evaporated aluminum having a thickness of 200 nm, a first silicon nitride layer having a thickness of 104 nm, a first silicon layer having a thickness of 56 nm, and a second silicon nitride layer having a thickness of 120 nm, a second silicon layer having a thickness of 3.7 nm, and a third silicon nitride layer having a thickness of 50 nm. As can be seen in both FIGS. 10 and 11, the average reflectance in the solar near-infrared region of 800 to 2500 nm is high. In particular, the average reflectance is greater than 75% in the solar near-infrared region wavelength region. In the visible light region of 400 to 700 nm, the reflectance and hence average reflectance is much lower than the average reflectance in the solar near-infrared region. Due to these reflective characteristics of the reflective pigments as designed herein, it is possible to have opaque dark visual colors that have high reflectance of solar near-infrared radiation compared to products using conventional reflective multilayer pigments or conventional cool pigments.

Figure 12:
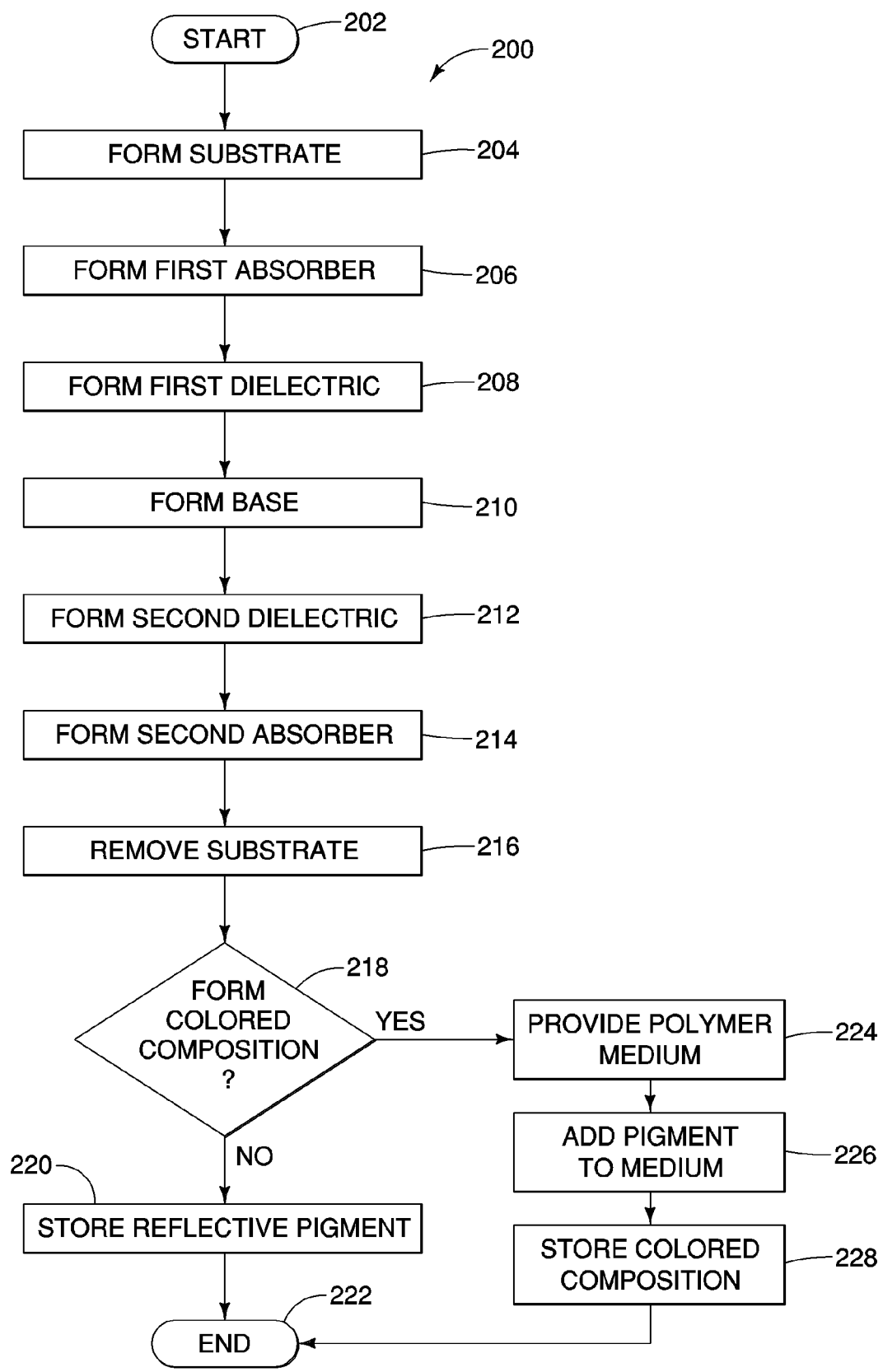
FIG. 12 is a flow chart illustrating a process of producing a reflective pigment and colored composition.

Turning now to FIG. 12, a process for producing a reflective pigment is generally shown as 200. The present process 200 illustrates formation of the reflective pigment 52 shown in FIG. 5A. However, other steps which add one or more additional polymer, dielectric, and/or absorber layers are contemplated with the present process. Moreover, the particular arrangement of the layers can vary depending upon the desired stacking of the layers. For example, the polymer layer can be an inner layer or an outer layer. To facilitate understanding of the stacking process to form the reflective pigment, each absorber layer and dielectric layer is partitioned into two layers that are deposited upon the stacked structure in separate steps. However, with respect to the process of forming a reflective pigment is should be understood that the steps of forming a dielectric layer, such as dielectric layer 66 in FIG. 5A, are defined as separate dielectric layer formation steps to facilitate understanding of the stacking process. However, a single step process of forming a dielectric or absorber layer as discussed herein with respect to the process would apply to forming an absorber or dielectric layer in a reflective coating process. In the case of the reflective coating process, the coating would not be released from the substrate but would remain permanently attached to the substrate.

The process 200 starts at step 202 wherein a particular color and solar near-infrared reflectance goal is selected for the cool color reflective pigment to be fabricated. Based on this selection, the thicknesses of the layers are tailored to achieve the desired color and solar near-infrared reflectance. The process then proceeds to step 204 wherein a releasable substrate is provided. The releasable substrate preferably is a Mylar film having a release layer thereon. Next, a first portion of the absorber layer is formed on the releasable substrate at step 206. The first portion absorber layer preferably is an amorphous silicon layer. The process then proceeds to step 208 and provides a first portion of a dielectric layer on the first portion absorber layer. Preferably, the first portion dielectric layer is a silicon nitride layer.

A base layer is then formed on the first portion dielectric layer at step 210. The base layer can be formed of a single metal layer or stacked structure which includes a polymer layer as discussed above. Preferably, the base layer is an aluminum layer. Step 212 has the second portion of the dielectric layer formed on the base layer. Similar materials as the first portion dielectric layer can be used for the second portion dielectric layer. At step 214, a second portion of the absorber layer is provided on the second portion dielectric layer, and can be formed of similar materials as the first portion absorber layer.

Next, at step 216 the releasable substrate is removed from the first portion absorber layer to produce the reflecting pigment. Optionally, a choice can be included at step 218 to determine whether or not the reflective pigment should be stored (NO) for further use in a binder or other mixture, or formed as a colored composition (YES). If no colored composition is desired, then the process proceeds to step 220, stores the reflective pigment, and then ends at step 222. Otherwise, if a colored composition is desired, then a polymer medium is provided at step 224 and the reflective pigment is dispersed within the polymer medium at step 226. Next, the colored composition is stored at step 228 and the process ends at step 222.

As discussed above, the substrate in each of these embodiments for reflective pigments is releasable, which allows the reflective pigment to be separated from the substrate after the various layers have been applied to the substrate. Moreover, at least some of these embodiments for reflective pigments it is envisioned that at least some layers are formed on the releasable substrate, and no layers are formed after the stacked structure is released from the substrate. Generally, the substrate is designed to be as wide as needed, and preferably has a width of one to seven feet. While polyvinyl alcohol (PVA) release coated Mylar film is contemplated as being used as the preferred release coated substrate for the embodiments discussed above, other release coatings besides PVA materials can be used such as those that require non-aqueous solvents and are well known in the art.

While certain presently preferred embodiments of the invention have been herein described, it is to be appreciated that variations, changes and modifications may be made therein without departing from the scope of the invention, as defined by the appended claims. For example, additional absorber and dielectric layers could be added to the embodiments herein, or the layer thicknesses could be greater or less than those shown.

What is claimed:

1. A cool dark-colored reflective coating comprising:
a base layer having a reflective surface;
a dielectric layer formed on said reflective surface; and
an absorber layer formed on said dielectric layer formed on said reflective surface of said base layer,
said absorber layer comprising a semiconductor material with a band gap of 1.55 to 1.77 eV; wherein said absorber layer comprises amorphous silicon and said dielectric layer comprises silicon nitride, silicon dioxide, nitrides, oxides, or fluorides;
wherein an average reflectance of said reflective coating for wavelengths of electromagnetic radiation in the range of 800 to 2500 nm irradiated upon said reflective coating is greater than about 70%, and an average reflectance of said reflective coating for wavelengths of electromagnetic radiation in the range of 400 to 700 nm irradiated upon said reflecting coating is less than said average reflectance of said reflective coating from 800 to 2500 nm.

2. The cool dark-colored reflective coating of claim 1, wherein said dielectric layer has an index of refraction at 550 nm of about 1.3 to 2.5 and an extinction coefficient for electromagnetic radiation in the wavelength range of 400 to 2500 nm of less than about 0.1.

3. The cool dark-colored reflective coating of claim 1, wherein said dielectric layer formed on said reflective surface of said base layer has a thickness of about 10 to 220 nm, and said absorber layer has a thickness of about 10 to 100 nm.

4. The cool dark-colored reflective coating of claim 1, further comprising a second dielectric layer being formed on said absorber layer, said second dielectric layer having an index of refraction at 550 nm of about 1.3 to 2.5 and an extinction coefficient from 400 to 2500 nm of less than about 0.1.

5. The cool dark-colored reflective coating of claim 4, wherein said dielectric layer formed on said reflective surface of said base layer has a thickness of about 10 to 220 nm, said absorber layer has a thickness of about 10 to 100 nm, and said second dielectric layer has a thickness of about 25 to 500 nm.

6. The cool dark-colored reflective coating of claim 4, further comprising a second absorber layer formed on said second dielectric layer.

7. The cool dark-colored reflective coating of claim 6, wherein said dielectric layer formed on said reflective surface of said base layer has a thickness of about 10 to 220 nm, said absorber layer has a thickness of about 10 to 100 nm, said second dielectric layer has a thickness of about 90 to 200 nm, and said second absorber layer has a thickness of about 1 to 200 nm.

8. The cool dark-colored reflective coating of claim 6, further comprising a third dielectric layer being formed on said second absorber layer, said third dielectric layer having an index of refraction at 550 nm of about 1.3 to 2.5 and an extinction coefficient from 400 to 2500 nm of less than about 0.1.

9. The cool dark-colored reflective coating of claim 8, wherein said dielectric layer formed on said reflective surface of said base layer has a thickness of about 30 to 150 nm, said absorber layer formed on said dielectric layer formed on said reflective surface of said base layer has a thickness of about 40 to 80 nm, said second dielectric layer has a thickness of about 90 to 200 nm, said second absorber layer has a thickness of about 2 to 10 nm, and said third dielectric layer has a thickness of about 30 to 500 nm.

10. The cool dark-colored reflective coating of claim 9, wherein said metal layer is an aluminum layer.

11. The cool dark-colored reflective coating of claim 1, wherein said base layer is a metal layer.

12. The cool dark-colored reflective coating of claim 1, wherein said absorber layer has an n/k value greater than about 10 at 700 nm and greater than about 100 at 1250 nm, where n is the refractive index of the absorber layer and k is the extinction coefficient of the absorber layer.

13. The cool dark-colored reflective coating of claim 1, wherein said dielectric layer comprises silicon nitride.

14. The cool dark-colored reflective coating of claim 1, wherein the average reflectance is greater than about 75% for wavelengths of electromagnetic radiation in the range of 800 to 2500 nm.

15. The cool dark-colored reflective coating of claim 1, wherein the layers of said reflective coating is structured to reflect at least 50% more electromagnetic radiation at 800 nm than at 700 nm.

16. A cool dark-colored reflective pigment comprising:
a base layer having a top reflective surface and a bottom reflective surface;
a dielectric layer formed on said top and bottom surfaces of said base layer; and
an absorber layer formed on said dielectric layer formed on said top and bottom surfaces of said base layer, said absorber layer comprising a semiconductor material having a band gap of 1.55 to 1.77 eV;
wherein said dielectric layer has an index of refraction at 550 nm of about 1.3 to 2.5; wherein said absorber layer comprises amorphous silicon and said dielectric layer comprises silicon nitride, silicon dioxide, nitrides, oxides, or fluorides; and
wherein an average reflectance of said reflective pigment for wavelengths of electromagnetic radiation in the range of 800 nm to 2500 nm irradiated upon said reflective pigment is greater than about 70%, and an average reflectance of said reflective pigment for wavelengths of electromagnetic radiation in the range of 400 nm to 700 nm irradiated upon said reflecting pigment is less than said average reflectance of said reflective pigment from 800 nm to 2500 nm.

17. The cool dark-colored reflective pigment of claim 16, further comprising a polymer layer being formed on said absorber layer.

18. The cool dark-colored reflective pigment of claim 16, further comprising a second dielectric layer being formed on said absorber layer, said second dielectric layer having an index of refraction at 550 nm of about 1.3 to 2.5.

19. The cool dark-colored reflective pigment of claim 18, further comprising a polymer layer being formed on said second dielectric layer.

20. The cool dark-colored reflective pigment of claim 18, wherein said dielectric layer formed on said top and bottom surfaces of said base layer has a thickness of about 10 to 220 nm, said absorber layer has a thickness of about 10 to 100 nm, and said second dielectric layer has a thickness of about 25 to 500 nm.

21. The cool dark-colored reflective pigment of claim 18, further comprising a second absorber layer formed on said second dielectric layer.

22. The cool dark-colored reflective pigment of claim 21, further comprising a polymer layer formed on said second absorber layer.

23. The cool dark-colored reflective pigment of claim 21, wherein said dielectric layer formed on said top and bottom surfaces of said base layer has a thickness of about 10 to 220 nm, said absorber layer formed on said dielectric layer formed on said top and bottom surfaces of said base layer has a thickness of about 10 to 100 nm, said second dielectric layer has a thickness of about 90 to 200 nm, and said second absorber layer has a thickness of about 1 to 200 nm.

24. The cool dark-colored reflective pigment of claim 21, further comprising a third dielectric layer being formed on said second absorber layer, said third dielectric layer having an index of refraction at 550 nm of about 1.3 to 2.5.

25. The cool dark-colored reflective pigment of claim 24, further comprising a polymer layer being formed on said third dielectric layer.

26. The cool-colored dark reflective pigment of claim 24, wherein said dielectric layer formed on said top and bottom surfaces of said base layer has a thickness of about 30 to 150 nm, said absorber layer formed on said dielectric layer formed on said top and bottom surfaces of said base layer has a thickness of about 40 to 80 nm, said second dielectric layer has a thickness of about 90 to 200 nm, said second absorber layer has a thickness of about 2 to 10 nm, and said third dielectric layer has a thickness of about 30 to 500 nm.

27. The cool dark-colored reflective pigment of claim 16, wherein said dielectric layer formed on said top and bottom surfaces of said base layer has a thickness of about 10 to 220 nm, and said absorber layer has a thickness of about 10 to 100 nm.

28. The cool dark-colored reflective pigment of claim 16, wherein said base layer is an aluminum/polymer/aluminum layered structure.

29. The cool dark-colored reflective pigment of claim 28, wherein said polymer layer has a thickness of about 1000 to 3000 nm.

30. The cool dark-colored reflective pigment of claim 16, wherein the layers of said reflective pigment is structured to reflect at least 50% more electromagnetic radiation at 800 nm than at 700 nm.

31. A cool dark-colored reflective coating comprising:
   a base layer having a reflective surface;
   a dielectric layer formed on said reflective surface; and
   an absorber layer formed on said dielectric layer formed on said reflective surface of said base layer,
   said absorber layer comprising a semiconductor material with a band gap of 1.55 to 1.77 eV; wherein said absorber layer comprises amorphous silicon and said dielectric layer comprises silicon nitride, silicon dioxide, nitrides, oxides, or fluorides;
   wherein said reflective coating reflects all wavelengths of electromagnetic radiation in the range of 800 to 2500 nm irradiated upon said reflective coating greater than about 70%.

32. The cool dark-colored reflective coating of claim 31, wherein said metal layer comprises aluminum.

33. The cool dark-colored reflective coating of claim 31, further comprising a second dielectric layer being formed on said absorber layer, wherein said dielectric layer formed on said reflective surface of said base layer has a thickness of about 10 to 220 nm, said absorber layer has a thickness of about 10 to 100 nm, and said second dielectric layer has a thickness of about 25 to 500 nm.

34. The cool dark-colored reflective coating of claim 33, further comprising a second absorber layer formed on said second dielectric layer, wherein said dielectric layer formed on said reflective surface of said base layer has a thickness of about 10 to 220 nm, said absorber layer has a thickness of about 10 to 100 nm, said second dielectric layer has a thickness of about 90 to 200 nm, and said second absorber layer has a thickness of about 1 to 200 nm.

35. The cool dark-colored reflective coating of claim 34, further comprising a third dielectric layer being formed on said second absorber layer, wherein said dielectric layer formed on said reflective surface of said base layer has a thickness of about 30 to 150 nm, said absorber layer formed on said dielectric layer formed on said reflective surface of said base layer has a thickness of about 40 to 80 nm, said second dielectric layer has a thickness of about 90 to 200 nm, said second absorber layer has a thickness of about 2 to 10 nm, and said third dielectric layer has a thickness of about 30 to 500 nm.

36. A cool dark-colored reflective pigment comprising:
   a base layer having a top reflective surface and a bottom reflective surface;
   a dielectric layer formed on said top and bottom surfaces of said base layer; and
   an absorber layer formed on said dielectric layer formed on said top and bottom surfaces of said base layer, said absorber layer comprising a semiconductor material having a band gap of 1.55 to 1.77 eV;
   wherein said dielectric layer has an index of refraction at 550 nm of about 1.3 to 2.5; wherein said absorber layer comprises amorphous silicon and said dielectric layer comprises silicon nitride, silicon dioxide, nitrides, oxides, or fluorides; and
   wherein said reflective pigment reflects all wavelengths of electromagnetic radiation in the range of 800 to 2500 nm irradiated upon said reflective pigment greater than about 70%.

37. The cool dark-colored reflective pigment of claim 36, further comprising a polymer layer being formed on said absorber layer.

38. The cool dark-colored reflective pigment of claim 36, further comprising a second dielectric layer being formed on said absorber layer.

39. The cool dark-colored reflective pigment of claim 38, further comprising a polymer layer being formed on said second dielectric layer.

40. The cool dark-colored reflective pigment of claim 38, further comprising a second absorber layer formed on said second dielectric layer.

41. The cool dark-colored reflective pigment of claim 40, further comprising a polymer layer formed on said second absorber layer.

* * * * *